April 7, 1953

R. H. GODDARD 2,633,706

COMBUSTION CHAMBER WITH TARGET RECESS
FOR USE IN ROCKET APPARATUS

Filed June 28, 1946

INVENTOR.
Robert H. Goddard, Dec'd.
Esther C. Goddard, Executrix.
BY
Chas. T. Hawley
ATTY.

April 7, 1953

R. H. GODDARD 2,633,706

COMBUSTION CHAMBER WITH TARGET RECESS
FOR USE IN ROCKET APPARATUS

Filed June 28, 1946

INVENTOR.
Robert H. Goddard, Decd.
Esther C. Goddard, Executrix
BY
Chas. T. Hawley
ATTY.

Patented Apr. 7, 1953

2,633,706

UNITED STATES PATENT OFFICE 2,633,706

COMBUSTION CHAMBER WITH TARGET RECESS FOR USE IN ROCKET APPARATUS

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application June 28, 1946, Serial No. 680,229

7 Claims. (Cl. 60—39.46)

This invention relates to a combustion chamber designed to operate with high efficiency when using liquid combustion agents, such as gasoline or methane and liquid oxygen or ozone. The initial reaction between such liquids is violent and produces high temperature and high velocity of the combustion gases at the point of ignition.

It is the general object of the present invention to provide a combustion chamber so designed and constructed that the heat of such combustion gases will be progressively transformed to energy of motion; that the mechanical energy of the rapidly moving gases will not be substantially reduced by friction; that combustion will be progressively completed at falling temperatures, and that the combustion gases will leave the chamber at very high velocity but at relatively low pressure and temperature.

To the attainment of this general object, several forms of combustion chamber are disclosed herein which are of uniform or increasing diameter toward the discharge end thereof and in which said discharge end is entirely open and unobstructed.

The invention further relates to arrangements and combinations of parts which will be hereinafter described and more particularly pointed out in the appended claims.

Preferred forms of the invention are shown in the drawings, in which

Figure 1:
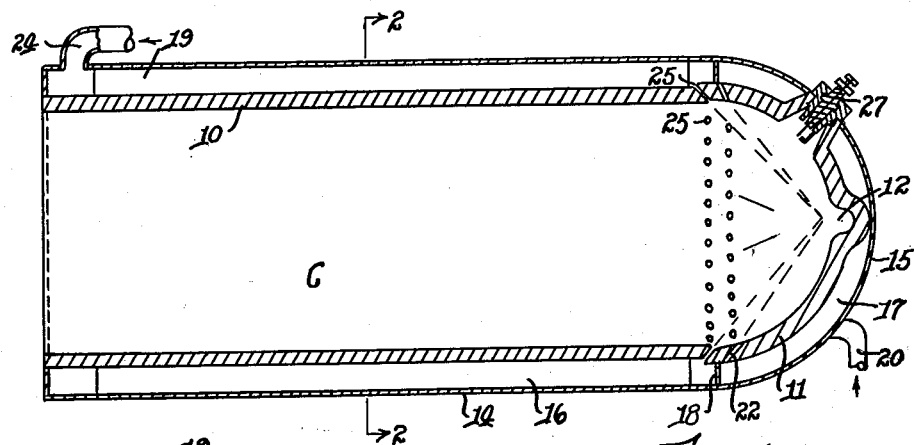
Fig. 1 is a sectional side elevation of an elongated cylindrical combustion chamber embodying the invention.
Figure 2:
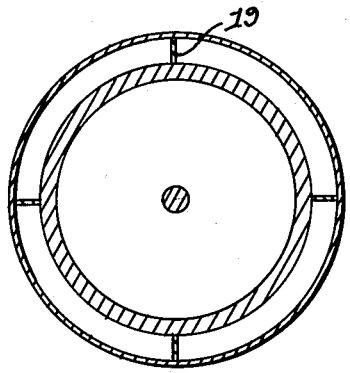
Fig. 2 is a transverse sectional elevation, taken along the line 2—2 in Fig. 1.

Referring to Figs. 1 and 2, the combustion chamber C therein shown comprises an inner casing or chamber wall 10 having a semi-spherical inner end portion 11 provided with an axial target recess 12. The combustion chamber C is surrounded by a cylindrical jacket casing 14 and a semi-spherical jacket casing 15, which casings enclose jacket spaces 16 and 17 separated by an annular partition 18. Partitions 19 (Fig. 2) extend longitudinally of the jacket space 16 and hold the casing 14 in the desired spaced relation with reference to the chamber wall 10 but are stopped off short of the ends of said jacket space.

Liquid fuel, such as gasoline or methane, is supplied under pressure to the space 17 through a pipe 20 and is sprayed into the combustion chamber through feed openings 22 in the chamber wall portion 11 which are directed toward the chamber end wall 11. A liquid-oxidizing agent, such as liquid oxygen or ozone, is similarly supplied under pressure through a feed pipe 24 and is sprayed through an annular series of openings 25 in the inner end portion of the wall 10.

These two sprays are focussed and intersect at a point adjacent the axial target recess 12 in the inner end wall 11 and at this point are intimately intermingled by their high-speed impact, so that initial combustion can take place. A spark-plug 27 may be provided to start combustion.

As initial combustion takes place, the gases and unconsumed combustion elements rebound from the semispherical end portion 11 and target recess 12 and travel toward the open or left-hand end of the cylindrical combustion chamber. As the gases move away from the point of initial combustion, the temperature of the gases gradually falls, further combustion takes place, and the volume and speed of movement of the gases increase. The incoming sprays are so disposed that they do not interfere with the axial travel of the combustion gases.

The cylindrical portion 10 of the combustion chamber is made of such length that the gases will be at a relatively low temperature and approximately at atmospheric pressure at their point of discharge through the open end of the chamber. If the liquids are sprayed under relatively high pressure, the pressure at the inner or closed end of the combustion chamber may be considerable.

Figure 3:
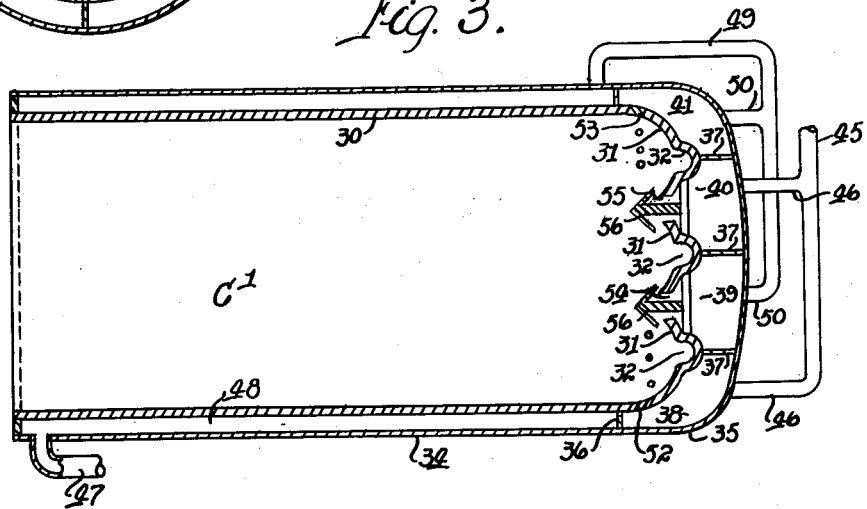
Fig. 3 is a view similar to Fig. 1 but showing a combustion chamber of relatively increased diameter.

With this type of combustion chamber, it is found that final combustion is very nearly complete; that the heat of the gases is very effectively transformed into energy of motion or transferred to the cold liquids in the jackets, and that frictional losses in the combustion chamber are reduced to a minimum.

Where it is desired to increase the capacity of the chamber without corresponding increase in length, the construction shown in Fig. 3 may be used. The combustion chamber C' has a cylindrical wall 30, as in Fig. 1, but the inner end of the chamber is formed with a plurality of segmental recesses 31, each having a small target recess 32 axially positioned relative thereto. The combustion chamber C' is surrounded by jacket casings 34 and 35, separated by a partition 36 and with the jacket space within the casing 35 further subdivided by partitions 37 into jacket spaces 38, 39, 40 and 41.

Fuel is supplied under pressure to the jacket spaces 38 and 40 by a feed pipe 45 and branch pipes 46. A liquid oxidizing agent is supplied under pressure through a feed pipe 47 to the cylindrical jacket space 48 and is transferred therefrom through a pipe 49 and branch pipes 50 to the jacket spaces 39 and 41. Inwardly directed feed openings 52 admit sprays of liquid fuel from the fuel jacket space 38, and similar openings 53 admit sprays of liquid oxygen from the oxygen jacket space 41.

Openings 54 and 55 are provided from the jacket spaces 39 and 40 to the interior of the chamber C', and these openings are supplied with spreaders 56, so that a conical spray of liquid oxygen will be admitted through the opening 54 and a corresponding spray of liquid fuel will be admitted through the opening 55.

The operation and advantages of this combustion chamber are similar to those of the chamber shown in Figs. 1 and 2 and previously described, but with the additional feature that a relatively larger inner end portion of the chamber can be effectively covered with intermingled sprays and a correspondingly larger volume of combustion gases may be produced.

Figure 4:
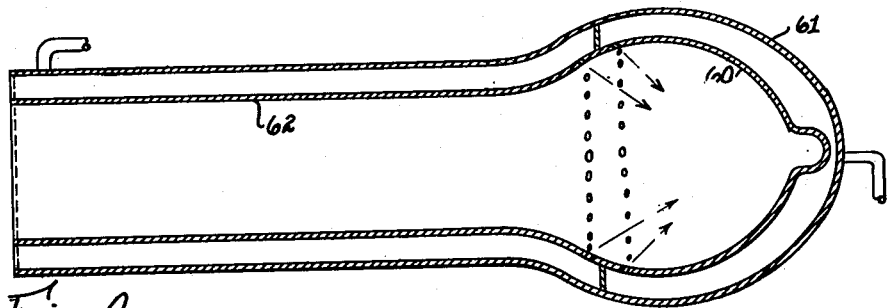
Fig. 4 is a transverse sectional elevation of an elongated cylindrical combustion chamber having an enlarged segmental spherical inner end portion.

The chamber shown in Fig. 4 is of a construction quite similar to that shown in Fig. 1, with the exception that the inner end portion 60 of the chamber wall is enlarged to approximately three-quarters of a spherical section, with corresponding increase in the jacket casing 61. This construction provides increased space for mixing and initial combustion of liquids which do not mix and intermingle as readily as the liquids commonly used in the construction shown in Fig. 1.

Figure 5:
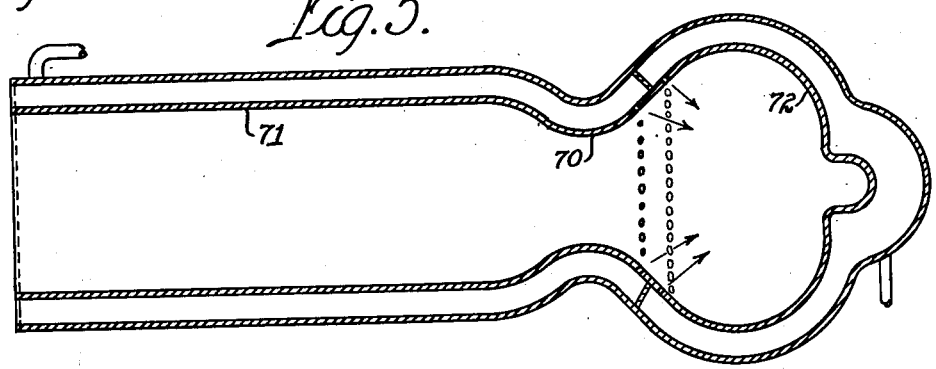
Fig. 5 is a view similar to Fig. 4 but showing a combustion chamber having a contracted intermediate section between the open cylindrical portion and the enlarged inner end portion.

The enlarged inner end portion serves mainly as a mixing space, as the very high temperature therein prevents anything like complete combustion. Further combustion takes place gradually along the cylindrical portion 62 of the chamber, as in the forms previously described.

Where even more favorable provision for mixing the combustion liquids appears desirable, the form shown in Fig. 5 may be used, in which an intermediate portion 70 of reduced diameter connects the cylindrical portion 71 of the chamber with the substantially enlarged inner end portion 72. With this construction, the intimate mixing described with reference to Fig. 4 is carried out in even greater degree.

Figure 6:
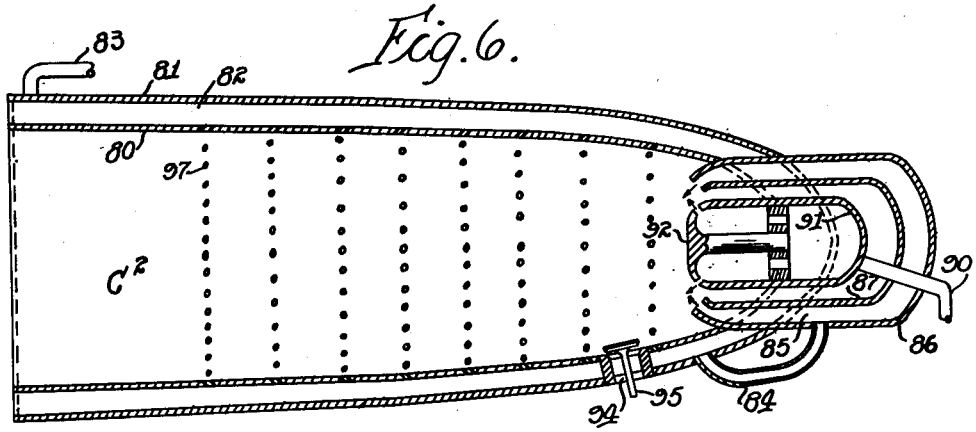
Fig. 6 is a longitudinal sectional elevation of a combustion chamber which is gradually enlarged toward the open end and which has special provision for cooling the chamber wall.

The construction shown in Fig. 6 is desirable where the combustion liquids mix very readily and with extreme rapidity. With such liquids, it is possible to reduce the mixing space relative to the space provided for progressive combustion. Accordingly, a combustion chamber C2 is provided in which the inner end portion is of relatively smaller diameter, and in which the chamber increases progressively in diameter toward the open end thereof.

The combustion chamber C2 may have a wall 80, and a jacket casing 81 provides a jacket space 82 which receives liquid oxygen under pressure through a feed pipe 83. The jacket space 82 is connected by a pipe 84 to the annular storage space 85 between an outer casing 86 and an intermediate casing 87, both mounted at the closed end of the chamber C2.

Liquid oxygen is sprayed into the combustion chamber through an annular slot or opening between the inner ends of the casings 86 and 87. Liquid fuel is supplied under pressure through a feed pipe 90 to an inner casing 91 extending into the combustion chamber and provided with a spreader 92. The fuel is sprayed through the annular opening between the inner edge of the casing 91 and the spreader 92. The annular space between the casings 87 and 91 prevents freezing of the liquid fuel by the liquid oxygen. Combustion may be started by introducing a flame through an opening 94 normally closed by a valve 95. A flame-type igniter is shown in the prior Goddard Patent No. 2,090,039, issued August 17, 1937, and the valve 95 may be opened and closed manually.

Intimate mixing of the combustion liquids is accordingly achieved at the extreme inner end of the combustion chamber C2 where initial combustion takes place, and combustion progresses toward the open end of the chamber as the temperature and pressure are gradually lowered.

Figure 7:
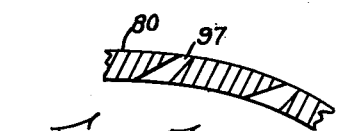
Fig. 7 is an enlarged detail section of a portion of the chamber wall shown in Fig. 6.

In order to cool the combustion chamber wall, annular series of fine openings 97 may be provided as clearly shown in Fig. 6, all of which openings are directed toward the open end of the combustion chamber. These openings are preferably enlarged inwardly as indicated in Fig. 7 to prevent interference with the flow of the liquid adjacent the chamber wall and to facilitate the formation of a protective liquid film.

Several forms of the invention having been thus described, it will be apparent that in all forms of the invention provision is made for initial combustion at very high temperature and for gradual completion of combustion as the temperature and pressure is progressively reduced toward the open end of the combustion chamber. Heat energy is thus very effectively transformed to energy of motion, and losses by friction are reduced to a minimum.

Having thus described the invention and the advantages thereof, it will be understood that the invention is not to be limited to the details herein disclosed, otherwise than as set forth in the claims, but that what is claimed is:

1. A combustion chamber for liquid combustion agents comprising an elongated open-end wall portion and a concave inner end wall portion having an axial concave and depressed target recess, said wall portions having adjacent series of spray openings which are rearwardly and inwardly directed, and means to direct intersecting sprays of liquid combustion agents through said opening toward said inner end and said target recess.

2. A combustion chamber for liquid combustion agents comprising an elongated open-end wall portion and a substantially semi-spherical inner end wall portion having an axial concave and depressed target recess, said wall portions having adjacent series of spray openings which are rearwardly and inwardly directed, jacket casings having an annular partition providing two separate jacket spaces surrounding said two wall portions, means to supply two different liquid combustion agents to said jacket spaces, and means to direct sprays of said different combustion agents through said openings toward said target recess.

3. A combustion chamber for liquid combustion agents comprising an elongated open-end wall portion and a substantially semi-spherical inner end wall portion having an axial concave and depressed target recess, jacket casings having an annular partition providing two separate jacket spaces surrounding said two wall portions, means to supply two different liquid combustion agents to said jacket spaces, and means to direct sprays of said different combustion agents toward said target recess, said sprays being introduced through two annular series of spray openings disposed in parallel planes at either side of said annular partition and directed rearward and inward.

4. A combustion chamber for liquid combustion agents comprising a chamber casing having an elongated cylindrical portion entirely open at its outer end and having an inner portion in which initial but substantial combustion takes place, said inner portion having a segmental concave end wall of substantially spherical curvature and which comprises at least 180°, and said concave wall having an axial concave and depressed target recess, a jacket surrounding both portions of said combustion chamber and having an annular partition providing two separate jacket spaces collectively enclosing said outer cylindrical portion and said inner portion, means to supply two different liquid combustion agents to said two separate jacket spaces, and means to direct sprays of said two different combustion agents from said two jacket spaces toward said depressed target recess, said sprays being introduced through two annular series of spray openings in said chamber casing which are disposed in parallel planes at either side of said annular partition, and said openings being directed rearward and toward the chamber axis and toward the target recess.

5. A combustion chamber as set forth in claim 4 and in which the inner end portion of the combustion chamber is of segmental and substantially spherical section and of greater inside diameter than the cylindrical portion of the combustion chamber and is provided with a target recess at its extreme inner end, and in which means is provided to direct sprays of liquid fuel and liquid oxidizer into said segmental end portion and toward said target recess.

6. A combustion chamber as set forth in claim 4 and in which the inner end portion of the combustion chamber is of segmental and substantially spherical section and of greater inside diameter than the cylindrical portion of the combustion chamber and is provided with a target recess at its extreme inner end, and in which means is provided to direct sprays of liquid fuel and liquid oxidizer into said segmental end portion and toward said target recess, and in which a wall portion of reduced diameter connects the cylindrical portion of said combustion chamber and the segmental spherical wall portion.

7. A combustion chamber as set forth in claim 4 and in which the inner end portion of the combustion chamber is of oblate spheroidal cross section and of greater inside diameter than the cylindrical portion of the combustion chamber and is provided with a target recess at its extreme inner end, and in which means is provided to direct sprays of liquid fuel and liquid oxidizer into said segmental end portion and toward said target recess.

ESTHER C. GODDARD,
*Executrix of the last will and testament of Robert H. Goddard, deceased.*

REFERENCES CITED

The following references are of record in the file of this patent:

UNITED STATES PATENTS

| Number | Name | Date |
|---|---|---|
| 2,074,098 | Adams | Mar. 16, 1937 |
| 2,397,834 | Bowman | Apr. 2, 1946 |

OTHER REFERENCES

"Astronautics," March 1936, page 12.